C. S. MIDDLETON.
INTEREST CALCULATOR.
APPLICATION FILED JUNE 11, 1918.

1,349,081.

Patented Aug. 10, 1920.
2 SHEETS—SHEET 1.

Inventor
Charles S. Middleton

By Mason Fenwick & Lawrence,
Attorneys

C. S. MIDDLETON.
INTEREST CALCULATOR.
APPLICATION FILED JUNE 11, 1918.
1,349,081.
Patented Aug. 10, 1920.
2 SHEETS—SHEET 2.
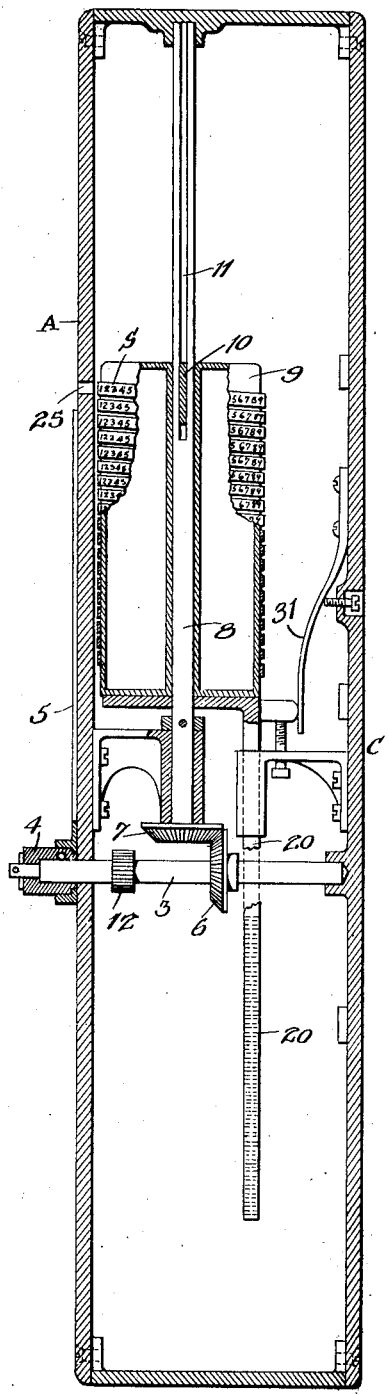
Fig. 2.
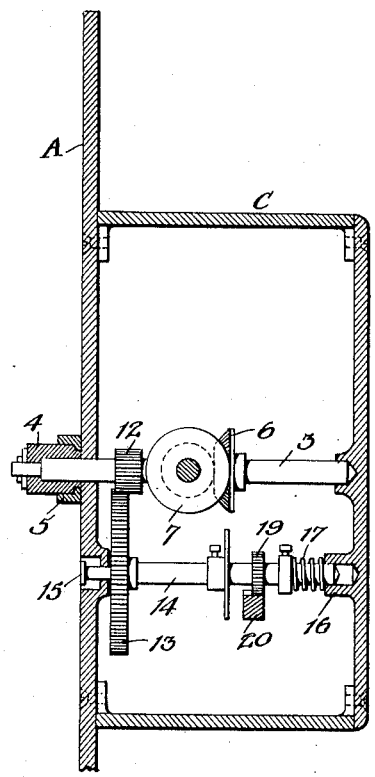
Fig. 3.
Fig. 4.
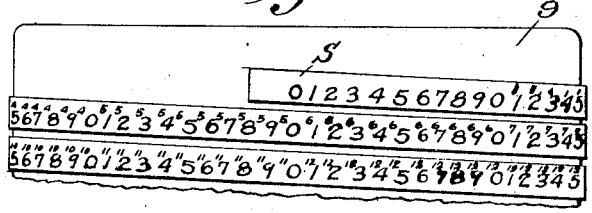
Fig. 5.
Inventor
Charles S. Middleton
By Mason Fenwick Lawrence,
Attorneys

UNITED STATES PATENT OFFICE.

CHARLES S. MIDDLETON, OF BLAKELY, GEORGIA.

INTEREST-CALCULATOR.

1,349,081.  Specification of Letters Patent.  Patented Aug. 10, 1920.

Application filed June 11, 1918. Serial No. 239,466.

*To all whom it may concern:*

Be it known that I, CHARLES S. MIDDLETON, a citizen of the United States, residing at Blakely, in the county of Early and State of Georgia, have invented certain new and useful Improvements in Interest - Calculators; and I do hereby declare the following to be a full, clear, and exact description of the invention, such as will enable others skilled in the art to which it appertains to make and use the same.

This invention relates to computing apparatus, and more particularly to devices for computing interest.

It is one of the objects of the present invention to provide a simple, practicable and readily operable device whereby interest on given principal sums for given time terms may be readily computed. A further object of the present invention is to provide a device in which the parts may be readily and quickly returned when desired to a reset position with the object of saving time in the operation of the device. With the above and other objects in view, the invention consists in the combination of a suitable chart, indicator and scale so organized that upon relative movement of the chart and the indicator to each other, that the scale will indicate a given sum of interest at a given rate for a given period of time, and there is described in the following specification and illustrated in the accompanying drawing, one form of the invention in which drawing:—

Fig. 2 is a vertical sectional view in the plane of the axis of the crank shaft;

Fig. 3 is a sectional detail showing the mechanism coupling the crank shaft and the scale whereby the latter is elevated;

Fig. 4 shows a modification of the scale helix provided with dual graduations for different rates of interest;

Fig. 5 is an enlarged detail view of the helix having a single graduation for a given rate of interest.

Figure 1:
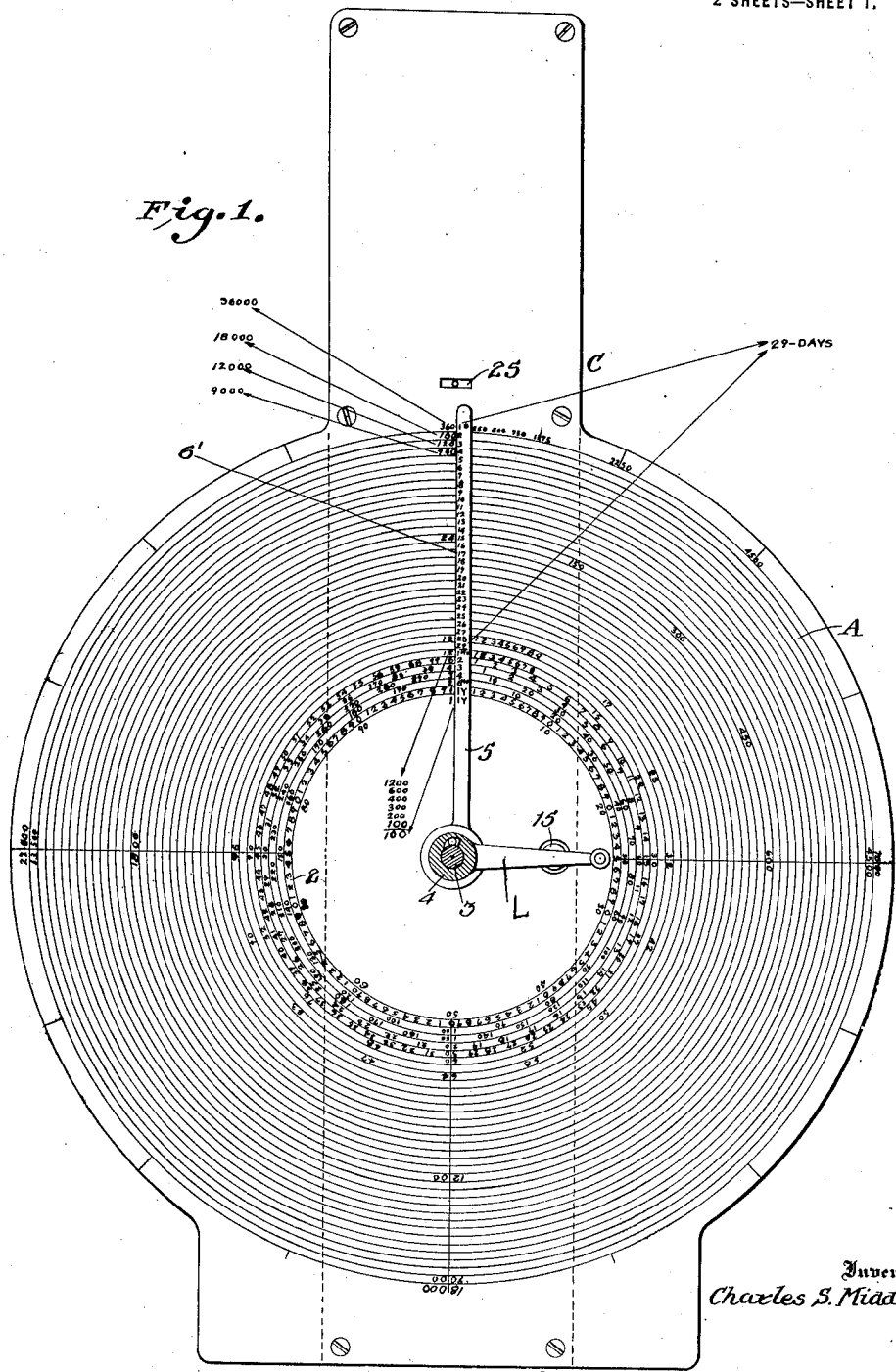
Figure 1 is a front elevation of the device.

The operating parts of the device may be inclosed in a suitable casing C of appropriate form, construction and material, the front of the casing being provided with a circular chart A, which is provided with a series of concentric rows of numerals 2, and through the center of the chart A, there is passed a crank shaft 3 on the forward or outer end of which there is secured or mounted a hub 4 the outer end of which carries an indicating arm or member 5, one edge of which preferably is set radial with relation to the center of the chart and axis of the crank shaft 3. The indicator arm 5 preferably is disposed close up against the face of the chart A so as to ride smoothly over the same while the outer face of the arm 5 is provided with a series of numerals 6' which are coördinately arranged with relation to the respective concentric circles of numerals 2 of the chart. Preferably the hub 4 of the crank is rigidly connected to the radial arm 5 and is adapted to be clutched to the crank shaft 3 when the latter is rotated in a clockwise direction, thus permitting the crank L and the indicating arm 5 to be turned counter-clockwise, independently of the crank shaft 3 as will be hereinafter described.

Inside of the casing C, the crank shaft is provided with a beveled gear 6 meshing with a complementary and similarly sized gear 7 the latter being fastened upon a vertical shaft 8 upon which there is slidably, non-rotatably mounted a suitable form of drum 9 shown as provided with a key 10 engaging a featherway 11 in the shaft 8, thus permitting the drum 9 to move vertically relative to the shaft. Also secured on the crank shaft 3 is a pinion 12 engaging with a gear 13 of suitable proportion with relation to the gear 12 and here indicated as of four times its size, the gear 13 being rigidly secured on a shaft 14 the forward end of which projects through the chart and is provided with a button 15 while the opposite end is slidably mounted in a bearing 16 against which reacts a spring 17, the function of which is to throw the shaft 14 forward in the casing, and hold a gear 19 in mesh with a rack 20 upon which is mounted or secured the lower end of the drum or cylinder 9.

By means of the above described mechanism, when the crank and the hub 4 are turned in a clockwise direction and the shaft 3 is clutched, then the pinion 12 rotates the gear 13 and through this the shaft 14 and the gear 19 which in its turn by engaging the rack causes the latter to be lifted a distance as determined by the proportion of the gears 12 and 13. For instance, if the gear 12 is two inches in circumference and the gear 13 eight inches in circumference, then for one revolution of the crank shaft 3 the gear 13 will be rotated a quarter revolution as will the gear 19, and if this is of two inches in circumference, then the rack 20 will be lifted a distance of a half an inch vertically. This results in an upward movement of the drum 9 along its shaft 8, while at the same time the drum 9 is rotated a complete revolution simultaneously with a complete revolution of the crank shaft 3.

The front of the casing C is provided, at a point just above the top of the chart, with a window or opening 25 just behind which the drum 9 is vertically disposed. On this drum there is a helical line of numerals in successive series or groups reading 0—1—2—3—4—5—6—7—8—9 indicative of tenths of dollars, there being six of these groups in one complete turn of the helix about the drum. Beginning with the second group of digits as clearly seen in Fig. 5, the groups are consecutively numbered by exponent figures "s," these indicating dollars so that when any one of the group number and its exponent is presented at the window this shows the result desired of a given problem. In operation when the drum is in lowermost position the first 0 of the first group is exhibited; one complete turn presents $0^6$ and each successive turn of the drum a 0 with a multiple of 6 for an exponent, this being the ratio followed if the scale is divided and indexed to give the answers of problems at 6% rate.

Referring now to the indicating arm 5, the numbers 6' thereon coördinating with respective concentric series of numbers on the chart, are provided for the purpose of indicating periods of time for which it is desired to calculate interest on a given sum, and the lowermost of the numbers 6' or the one nearest the center of the arm, designates the term one year, while the next outer series of numbers indicate the terms of six, four, three, two and one months, respectively, and above that the numerals are designed to indicate days, the numeral 1 at the end of the indicating arm indicating a single day. Therefore, there are as many concentric circles of numbers, representing sums on which interest is to be computed for the term, on the chart as there are numbers on the indicating arm with one in addition on the latter, for the purpose now to be explained. For convenience, a sight or reading line extends vertically above the axis of the crank shaft toward the reading opening and coincides with the radial edge of the arm 5 (Fig. 1), and the rows of numerals on the chart circles progressively increase in clockwise direction from the reading line. The circle of numbers on the chart which is coördinate with or opposite to the time designation, one year, on the radial arm is divided into one hundred equal parts so that if it is desired to ascertain the interest on one hundred dollars for one year at the rate of six per cent., the operator simply has to turn the crank shaft with the indicating arm a complete revolution in clockwise direction, and in this manner cause the cylinder 9 with its scale S to rotate a complete revolution which results in the elevating of the scale one pitch and the presentation of the numeral $0^6$ at the window 25 indicating that the interest is six dollars. The next outer circular row of figures and the one which is opposite the term six months on the radial arm is graduated into twenty equal parts and showing the sum two hundred dollars on the reading line, and therefore, if the operator desires to ascertain the amount of interest on one hundred dollars for six months, he simply turns the crank shaft with the indicating arm one-half a revolution until the reading edge of the indicating arm stops over the numeral 100 in the respective circle and which is immediately below the center of the chart, at which time there will appear at the window 25 a portion of the scale at $0^3$ indicating three dollars. If it be desired to ascertain the interest on six hundred dollars for fifteen days, the operator turns the dial arm 5 around over the chart reading on that row of numbers adjacent the day mark 15 on the dial arm until the latter coincides with the number 600 on the chart circle, at which time the scale S will have been turned to stand in a position so as to present the value $1.50 in front of the window 25 as shown by the scale index or numeral 5'.

From this it will be seen that I have provided a chart having a series of concentric circles coördinate with a suitable scale or indicating member which is provided with numerals indicating periods of time on which it is desired to figure interest for a particular sum and each of the circles has figures which represent the principal on which it may be desired to figure interest for a given time and therefore by simply moving the indicating arm to cause the registration of a time numeral with a principal numeral of the desired value, that the interest required will be instantly produced or indicated by the spiral scale. Of course it is understood that if the interest for one year and six months on any sum is required, then the operator will first find the interest for the term of one year on the sum and then will find the amount of interest on the same sum for the term of six months and add these together, but preferably by my mechanism he may turn the crank shaft 3 for a complete revolution to find the interest for one year and then by freely turning the crank shaft counterclockwise to bring the dial arm to zero position again he may again turn the arm clockwise reading on the six months index until the dial arm is brought to register with the respective value or principal sum on the adjacent scale of the chart and this will have added to the interest sum indicated by the scale in its first operation, the additional sum required for the month's computation. From this it will be understood that if it is desired to calculate three years' interest on a given sum, say four hundred dollars, it is only necessary to turn the crank shaft four successive times without interruption to obtain the desired results, or the operator may turn the crank shaft one complete revolution in a clockwise rotation of the crank and then freely ratchet the latter back over the crank shaft to the initial or zero position, and again repeat the rotation of the crank shaft the successive number of times required. The interest for one day on any principal sum may readily be obtained by swinging the radial arm 5 around the shaft reading at the same time on the outermost scale of the chart until the numeral 1, indicating one day is brought to register with the desired number indicating the given principal at which time it is only necessary to refer to the window to ascertain the sum indicated on the scale S. For example, if it be desired to ascertain the interest on thirty-six thousand dollars for one day, the operator would turn the crank shaft one complete revolution and this would advance the cylinder one revolution and cause the number $0^6$ to appear at the window indicating thereat the correct interest for this period on this given sum. To ascertain the interest on a sum for one year, one month and one day, these may each be accumulatively shown by the scale S, first by rotating the crank shaft to the position on the one year scale at which the desired sum is indicated, then returning the radial arm to zero and again advancing it to the position on the one month circular scale to the desired principal sum, then resetting the arm to the initial position and again turning it to the position on which the given sum will be caused to register with the one day numeral on the radial arm, the result of which would be that the drum 9 would have been turned three successive times a proportionate amount necessary to show the total interest required.

As shown in the modification in Fig. 4, two rates of interest are indicated on the scale S, this being accomplished by simply providing parallel scales on the one spiral, one indicating for instance, six per cent. and the other five per cent. rates, the respective scale graduations of the two rates being subdivided in fractions for the convenient reading of the sum at the window, so that in one instance for a complete revolution of the cylinder number $0^6$ would appear to be readable on the upper of the spiral scales, while the number $0^5$ would appear on the lower scale to show the amount due in that rate. For providing for the positive connection of the crank to the crank shaft for rotation in one direction and for free relative action in the opposite, any suitable friction or other desired form of clutch may be employed, in this instance, these members being connected by a friction or ball clutch.

For the purpose of permittting the rapid lowering or return of the elevated scale drum 9 to its lowermost or zero position after it may have been elevated to a considerable height by the operation of the crank shaft for a given problem, the operator simply has to press on the push button at the face of the chart thereby disconnecting the rack from its respective pinion whereupon the rack and the cylinder would instantly fall to the lowermost position and by simply turning the crank shaft the zero mark on the scale will be quickly presented again at the window 25, and then the rack and pinion may be again intermeshed for the next computation.

Spring 31 is adjustably held by a set screw in the path of the member 9 to cushion its fall during a return movement.

What is claimed as new is:—

1. In a device for calculating interest, a chart having a series of concentric lines of figures each figure representing the principal for a given problem, a relatively movable member provided with a series of numbers by indicating a time period and coördinate with said series of principal numbers, and means operative by one of said parts for indicating the interest charge on a given principal at a given rate for a given time.

2. In a device for calculating interest, a chart having a series of concentric lines of figures each figure representing the principal for a given problem, a relatively movable radial member provided with a series of numbers coördinate with said series of principal numbers, and axially and rotatively movable means operative by one of said parts for indicating the interest charge on a given principal at a given rate for a given time.

3. In a device for calculating interest, a chart having a series of concentric lines of figures indicative of the principal sum, a radial arm pivoted at the center of the circle of the series and having figures indicative of time terms in a problem and coördinate with respective principal series, and a scale member operative by said term arm for giving the interest on a given sum for a given term.

4. In a device for calculating interest, a chart having figures indicative of principal, a member movable thereover and having means indicating time terms, a scale having numbers indicating interest at a given rate, and means connecting said member and scale for coördinate operation.

5. In a device for calculating interest, a chart having figures indicative of principal sums, a relatively movable member having figures indicative of time terms; a scale having numbers denoting interest at a given rate, and means on which the scale is arranged operative upon relative movement of said chart and member to coördinate said scale to indicate interest on a given problem.

6. In a device for calculating interest, a chart having figures indicative of principal sums, a relatively movable member having figures indicative of time terms; and means including a helical scale operative upon the movement in one direction of said relatively movable member to indicate at a given point interest on a given problem.

7. In a calculating machine, in combination, concentric lines relatively graduated in ascending order, a scale pivoted concentric said lines having numerals coördinating with said lines, and a helical scale coöperating to exhibit the result of indications of said pivoted scale on said circles.

8. In a calculating machine, in combination, a finder rotatable relative to a dial, a summation scale, the axis of one of said members in radial alinement with the axis of the other, each provided with a shaft and relatively co-meshing gears on said shafts.

In testimony whereof I affix my signature.

CHARLES S. MIDDLETON.